Sept. 23, 1958 F. H. LEHMAN ET AL 2,853,557

SOUND DISTRIBUTION SYSTEM

Filed Jan. 28, 1955 2 Sheets-Sheet 1

INVENTORS.
FRANK H. LEHMAN &
PHILIP N. LEHR
BY
Campbell, Brumbaugh, Free & Graves
their ATTORNEYS.

Sept. 23, 1958 F. H. LEHMAN ET AL 2,853,557

SOUND DISTRIBUTION SYSTEM

Filed Jan. 28, 1955 2 Sheets-Sheet 2

INVENTORS.
FRANK H. LEHMAN &
PHILIP N. LEHR
BY Campbell, Brumbaugh, Free and Graves
their ATTORNEYS.

United States Patent Office 2,853,557

Patented Sept. 23, 1958

2,853,557

SOUND DISTRIBUTION SYSTEM

Frank H. Lehman, Scarsdale, and Philip N. Lehr, Huntington, N. Y., assignors to Dictograph Products Company, Inc., Jamaica, N. Y., a corporation of Delaware Application January 28, 1955, Serial No. 484,642

6 Claims. (Cl. 179—82)

The present invention relates to an audio frequency communication system for a limited area, and, more particularly, to a system wherein a free portable receiver for audio frequency signals can be attached to the wearing apparel of a person moving within the limited area.

In accordance with the invention, the system comprises an audio frequency transmitter including a closed-loop conductor disposed around the periphery of the area within which communications are desired, and a portable receiver which may be removably attached to the wearing apparel of a person moving or situated within the limited area. The audio frequency transmitter comprises an audio frequency signal source, a power amplifier for amplifying the output of the audio frequency signal source, and an impedance matching means for coupling the transmitter closed-loop conductor to the power amplifier so as to match the impedance of the output of the power amplifier with the impedance of the transmitter closed-loop conductor. The portable receiver comprises a bobbin-type pick-up coil coupled to a transistor type amplifier. The output of the transistor type amplifier is in turn connected to an acoustical transducer adapted to be fastened by means of a clip or similar device to the wearing apparel of the bearer. The acoustical transducer may include a horn with an exponential or folded exponential configuration.

In order to overcome dead spots within the limited area in which communications are desired, series reentrant loops or parallel auxiliary loops may be utilized.

The limited area encompassed by the transmitter closed-loop conductor may include one or more separate buildings or portions thereof. In the case of multi-story buildings, it has been found that one loop disposed around the periphery of a single floor may be sufficient to provide adequate communication to two or more of the floors of the building. However, in buildings having concrete flooring with reinforcing meshes therein, it has been found desirable to have one or more loops either on each of the floors of the building, or on alternate floors of the building.

For a more complete understanding of the invention, reference may be had to the following detailed description taken in conjunction with the accompanying figures of the drawing, in which.

Figures 6A, 7A:
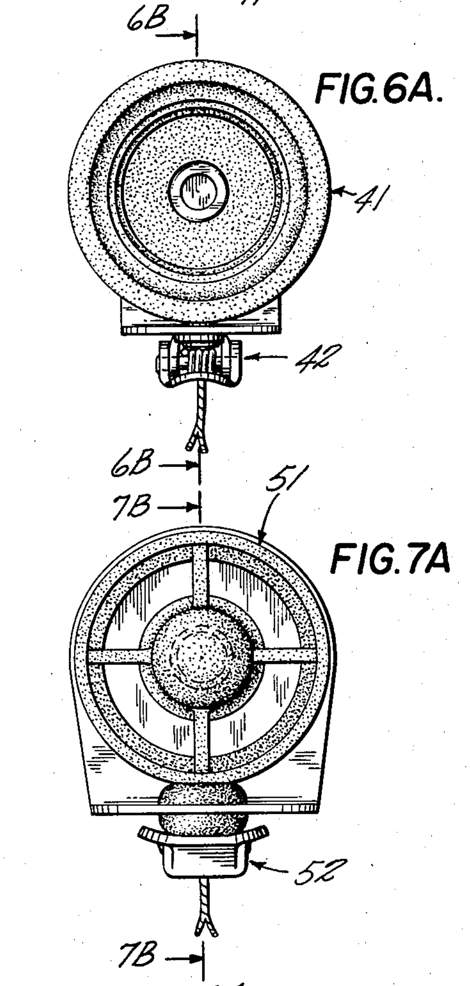
Fig. 6A is a front elevation of an exemplary embodiment of an acoustical driver and exponential acoustical horn.
Fig. 7A is a front elevation of an acoustical driver with a folded exponential acoustical horn.
Figure 7B:
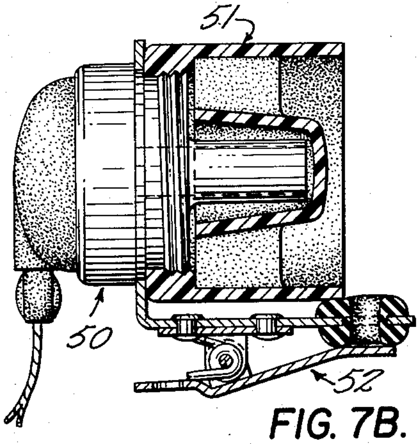
Figure 8A:
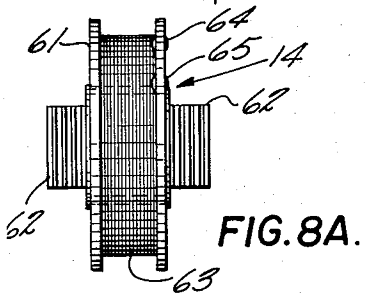
Figure 8B:
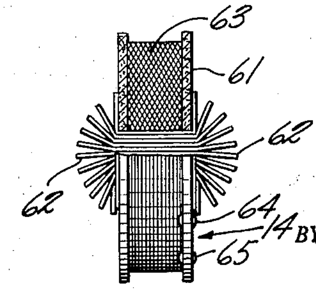

Fig. 7B is a side elevation of the acoustical driver and horn of Fig. 7A, in partial section taken along the line 7B—7B in Fig. 7A and looking in the direction of the arrows; and Figs. 8A and 8B are two side views, of an exemplary form of receiver pick-up coil, showing the details of the internal solenoidal iron core in the partially broken away view of Fig. 8B, the pick-up coil as seen in Fig. 8B being rotated 90° on the axis of its core from the view in Fig. 8A.

Figure 1:
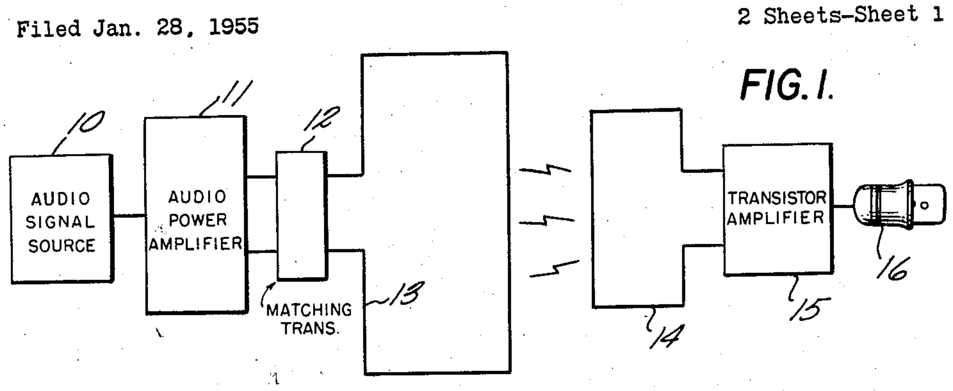
Figure 1 is a schematic block diagram of a communication system, in accordance with the invention.

Referring now to Fig. 1, the communication system includes a transmitter unit comprising an audio signal source 10 connected to an audio power amplifier 11, both of which may take any suitable conventional form. For example, the audio signal source 10 may be a microphone, phonograph or radio. The output of the audio power amplifier 11 is coupled through an impedance matching transformer 12 to a transmitter closed-loop conductor means 13, which is disposed around the periphery of the limited area in which communications are desired.

Inductively coupled to the transmitter closed-loop conductor means 13 is a receiver pick-up coil 14, which may take the form of the miniature bobbin shown in Figs. 8A and 8B. The receiver pick-up coil 14 is coupled to a transistor type amplifier 15, the output of which activates a transducer 16, which may comprise a miniature acoustical driver and horn, as shown in Figs. 6A and 6B, or 7A and 7B for example.

All of the elements of the receiver including the pick-up coil 14, the transistor amplifier 15 and the transducer 16 are adapted to be carried on or attached to the wearing apparel of a person situated within the limited area in which communication is desired.

Figure 2:
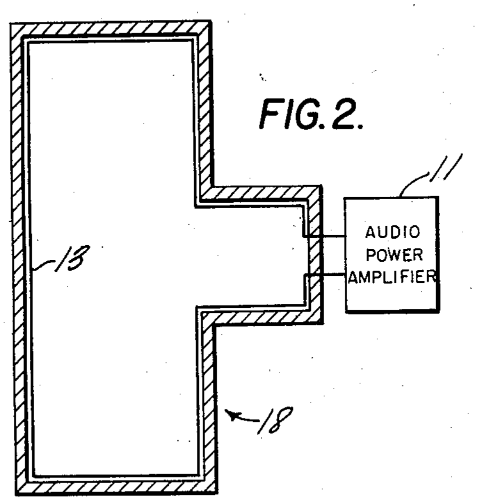
Fig. 2 is a schematic diagram showing one embodiment of a transmitter loop layout in a building structure.

The physical layout of the transmitter closed-loop conductor means 13 is not restricted to any particular form but is designed to conform to the configuration of the limited area. For example, in Fig. 2, the closed loop conductor means 13 may be disposed around the inner periphery of the walls of a building or room 18. On the other hand, if the walls are not constructed in such a manner as to shield the electromagnetic field produced by the closed-loop conductor means 13, the conductor means 13 may be located on the outer periphery of the building or room walls.

Figure 3:
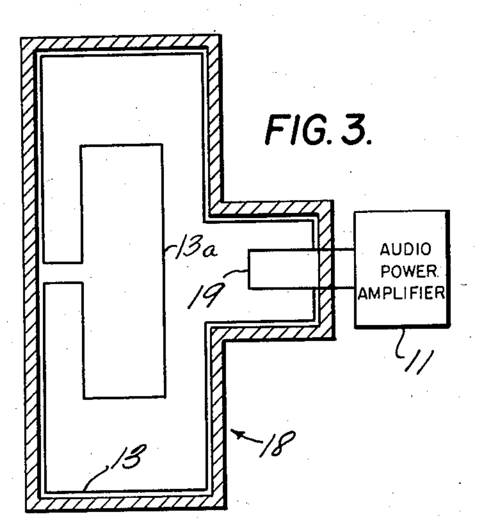
Fig. 3 is a schematic diagram of an alternate layout of the transmitter loop, including a series reentrant loop and a parallel auxiliary loop.

Under certain conditions, it is found that dead spots will occur within the limited area in which the communication is desired. These dead spots are points at which the field intensity of the electromagnetic field produced by the transmitter closed-loop conductor means 13 falls below the minimum value required to activate the acoustical transducer 16. In such a case, various forms of reentrant loops, such as the reentrant loop 13a of Fig. 3, can be formed in series with the main closed-loop conductor means 13. Also, parallel auxiliary loops, such as the auxiliary loop 19, can be used to cover certain dead spots, as will be understood by workers in the art.

With regard to multi-story buildings, it has been found that a single loop disposed around the periphery of one of the floor areas within which communications are desired can also be used to provide communications with additional floors above and below the floor at which the loop is disposed. For example, in two or three story buildings, it is usually sufficient, when it is desired to have communication throughout the building, to place a single transmitter closed-loop conductor means 13 around the inner or outer periphery of a single one of the floors of the building.

On the other hand, many modern multi-story buildings are constructed with thick concrete floors between each of the stories. In much of this type of construction, extensive steel reinforcing meshes are utilized in the concrete floors. These reinforcing meshes tend to shield the electromagnetic radiations from the transmitter closed-loop conductor means and limit communications to the particular floor or story at which the loop is located. In contrast to the electromagnetic shielding effect of the reinforcing meshes used in concrete flooring, it has been found that the steel girders and other support members in the walls and other portions of the structure do not materially shield or reduce the electromagnetic radiations from the transmitter closed-loop conductor means.

Figure 4:
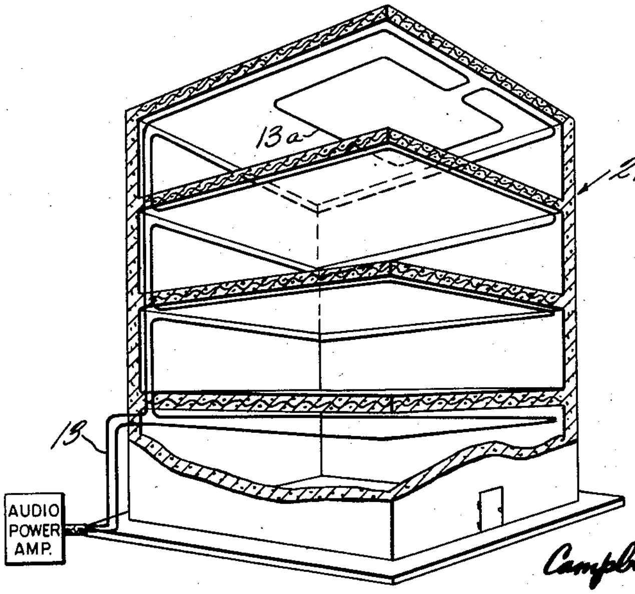
Fig. 4 is a schematic diagram of a transmitter loop layout in a multi-story building structure having reinforcing meshes between each of the floors of the structure.

In order to overcome the electromagnetic shielding effect of the reinforcing meshes in concrete floors of a building such as the multi-story structure 21 of Fig. 4, a plurality of loops preferably in series are spaced throughout the building. Depending upon the amount of the electromagnetic shielding provided by the reinforcing meshes in the concrete floor structures, the individual loops of the transmitter closed-loop conductor means 13 may be located at each of the floors in the building structure 21, as shown in Fig. 4, either at alternate floors or at floors spaced apart by two or more intermediate floors.

Reentrant loops 13*a* may also be utilized to eliminate dead spots on particular floors. It will be obvious to one skilled in the art, that a large variety of combinations of series reentrant groups 13*a*, auxiliary parallel loops 19, and/or other configurations of series and parallel loops can be utilized to satisfy the characteristics of any given building structure. Furthermore, the principles of the invention can be utilized to provide communication to a plurality of spaced-apart building structures by utilizing various combinations of series and parallel transmitter closed-loop conductor arrangements.

In designing a communication system, in accordance with the invention, it is necessary to take into consideration the electrical characteristics of the transmitter closed-loop conductor means 13, independently of its spatial configuration, so as to provide satisfactory reception in all portions of the limited area within which communication is desired. This must be done by maintaining the field intensity of the electromagnetic radiations from the transmitter closed-loop conductor means 13 at such a level as not to intefere with the operation of telephone switchboard and sub-station equipment and other electrical equipment that may be utilized in or adjacent to the area encompassed by the loop.

This is accomplished by restricting current values in the loop to the minimum value necessary to provide sufficient field intensity at all points within the limited area encompassed by the loop to operate the acoustical transducer means 16. This current value can be readily determined by utilizing the principles of the Law of Biot and Savart, whereby the intensity H at a point in a magnetic field established by a steady current flowing through a long straight wire may be determined by the relation $$H=2i/r \quad (1)$$

where $i$ is the current in the conductor and $r$ is the perpendicular distance of the point from the conductor. The minimum value of field intensity at the geometrical center of the loop is directly proportional to the area of that loop, as seen in the relation $$I_{\min}=\frac{A}{4P}H_{\min} \quad (2)$$

where A is the area of the loop and P is the perimeter of the loop.

Figure 5:
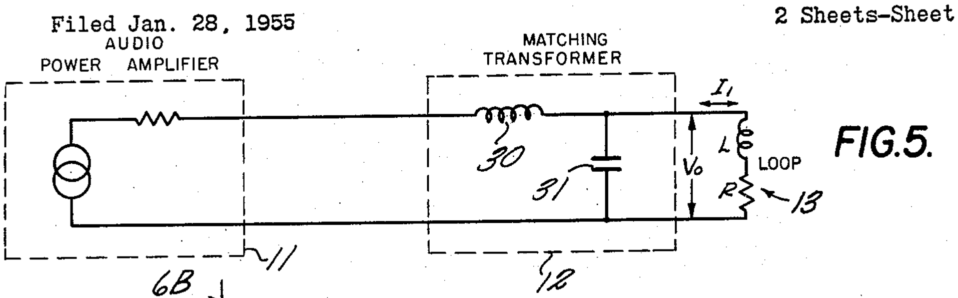
Fig. 5 is an electrical schematic diagram showing the details of an exemplary audio power amplifier and transmitter conductor loop with an impedance matching transformer coupling them.

In order to obtain the maximum transfer of current from the amplifier to the transmitter closed-loop conductor means 13, the impedance must be matched to the output impedance of the audio power amplifier 11. This is accomplished by an impedance matching transformer 12. The details of an exemplary embodiment of the impedance matching transformer 12 is shown in Fig. 5 in circuit with schematic representations of the loop or transmitter closed-loop conductor means 13 and the audio power amplifier 11.

In a typical installation, the transmitter closed-loop conductor means 13 may be disposed around the periphery of a rectangular area 75×25 ft.-sq. For such a loop having a perimeter of 200 ft., it will be obvious that a relatively large gauge wire should be used for the conductor means 13, for example, a wire size specified as AWG #10 (having a diameter of 0.1 in.). The loop resistance R for a conductor means 13 of this typical configuration would be in the order of .2 ohm. On the other hand, the value of the inductance L is in the order of 0.1 millihenry. Obviously, the resistance R of such a loop is negligible. Thus it will be evident that the load presented by the loop or conductor means 13 in the audio frequency range is highly conductive. In order to achieve a proper power match between the loop or conductor means 13 and the power amplifier 11 so as to obtain maximum loop current, the inductance of the load is compensated for by the impedance matching transformer 12.

The impedance matching transformer 12 may comprise a series inductance 30 and a shunt capacitance 31. The series inductance 30 may be the leakage reactance of the power output transformer (not shown) of the audio power amplifier 11 and the capacitance 31 may be an external compensating capacitor.

In this system, the input voltage for the transistor amplifier 15 is independent of frequency. Assuming that a constant voltage $V_0$ is delivered to the transmitter closed-loop conductor means 13, the current $I_1$ in the conductor means 13 will be represented by the relation $$I_1=\frac{V_0}{\omega L_{\text{loop}}} \quad (3)$$

Since the voltage $e_2$ induced in the receiver pick-up coil 14 is expressed by the relation $$e_2=\omega M_{12}I_1 \quad (4)$$

or $$e_2=\frac{V_0}{\omega L_{\text{loop}}}\cdot\omega M_{12}=\frac{V_0 M_{12}}{L_{\text{loop}}} \quad (5)$$

the input voltage to the transistor amplifier 15 is absolutely independent of frequency and the system is 100% faithful.

The transistor amplifier 15 may take any conventional form such as the small, very light weight pocket amplifiers used for hearing aids. The amplifier 15 is preferably powered by a long life type battery. The transistor amplifier unit may be placed in a pocket or fastened in any suitable manner to the wearing apparel of a person with whom communication is desired within the limited area.

While the acoustical transducer 16 may take any desirable form, it preferably may comprise a conventional acoustical driver as used in hearing aids, for example, and a directional horn for directing the sound waves produced by the acoustical driver.

Figure 6B:
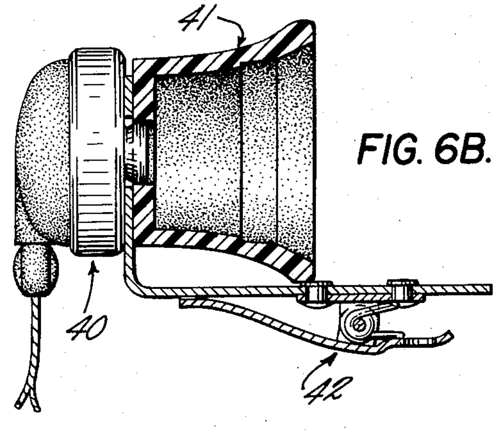
Fig. 6B is a side elevation partly in section, taken along line 6B—6B of Fig. 6A and looking in the direction of the arrows, of the driver and exponential acoustical horn of Fig. 6A.

In Figs. 6A and 6B, the acoustical driver 40 is similar in form to a conventional hearing aid driver. A plastic exponential type horn 41 may be snap coupled to the base of the driver 40 in any suitable fashion, such as that shown in Fig. 6B. A spring biased clip 42 is coupled to the driver 40 and the exponential horn 41, in such a manner as to permit the miniature driver and horn combination to be removably attached or fastened to the wearing apparel of the person carrying the receiver unit. The driver, horn, and clip unit, 40, 41, 42, should be attached to the bearer's clothing in such a manner that the sound waves produced thereby are directed toward the ear of the wearer.

The alternate embodiment of the transducer unit 16, as shown in Figs. 7A and 7B, includes a miniature acoustical driver 50 with a folded exponential type horn 51 and a spring biased clip 52.

The receiver pick-up coil 14 may comprise a miniature bobbin, as shown in Figs. 8A and 8B. The bobbin 61 may be composed of any suitable material such as fish paper, for example. The solenoidal iron core for the bobbin may consist of a plurality of laminations with the ends diverging from each other, as shown in Fig. 8B. The laminations 62 may be composed of any suitable conventional core material, preferably annealed silicon iron.

The bobbin may be wound with a number of turns of very fine wire 63, for example, two thousand turns of No. 39 Formex wire.

Since the electromagnetic field at the weakest point of the limited area in which communication is desired, usually the geometrical center, is vertical, and the physical mounting of the receiver pick-up coil 14 is preferably in an axially horizontal direction, as shown in Fig. 8B, the divergent ends of the laminations 62 provide a larger flux interception than would be available with conventional laminated cores.

A pair of terminals 64 and 65 for the wire 63 of the pick-up coil are provided on the bobbin 61.

In accordance with the invention, if the communication system is to be installed in hospitals, for example, such as for the paging of doctors, the transmitter closed-loop conductor means 13 is disposed around the periphery of the various buildings or portions of the buildings in which the paging service is required. The doctors or other personnel working in that area carry individual receiving units. The pick-up coil 14 and the transistor amplifier 15, which might be mounted within a small flat case, are carried in the breast pocket of their smocks. The acoustical transducer such as shown either in Figs. 6A and 6B, or Figs. 7A and 7B may then be attached by means of the clips 42 or 52 to the lapel of the smock.

The audio signal source 10, which is either a microphone or other type of transmitter, is located at a switchboard or other central point from which the doctors or other personnel are called.

When it is necessary to page a particular doctor, an operator at the central location merely calls for the doctor by name utilizing the transmitter or other audio signal source. If the doctor or other person being paged is anywhere within the limited area of communication, the audio frequency signals transmitted from the transmitter closed-loop conductor means 13 are picked up by the receiver pick-up coil 14 and amplified in the transistor amplifier 15. The signals are then converted in the acoustical transducer 16 into audio signals to advise the doctor that he is being paged.

Thus there has been provided a communication system with a portable receiver which can be carried upon the person of an individual moving within the limited area without any wire connections to wall sockets or other devices, which would prevent the free and unimpeded movement of the individual through the area. This system has an advantage over various types of conventional public address systems using loud speakers positioned in the various rooms within which communication is desired, in that the communications are transmitted privately only to those persons wearing the receiving equipment and in no way interfere with others who may be within the area.

Obviously, the above embodiments are meant to be merely exemplary and are subject to modification and variation without departing from the spirit and scope of the invention. For example, while the invention is preferably directed to what in all respects is a private communication system, in that only those wearing the receiving equipment receive the communications, the receiver pick-up coil 14 and the transistor amplifier 15 can be placed upon a table or other support in any location within the limited area and the output of the transistor amplifier 15 can be coupled to a conventional loud speaker. Thus the system can be used as a portable public address system, the receiving equipment of which can be moved freely within the limited area to any location without regard to the proximity of electrical outlets. Therefore, the invention is not deemed to be limited other than as set forth in the following claims.

We claim:

1. In a communication system for a limited area and including an audio frequency signal source; power amplifier means for amplifying the output of said audio frequency signal source; transmitter closed-loop conducting means disposed around the periphery of the area within which communications are desired; means coupling said transmitter closed-loop conducting means to said power amplifier means for matching the impedance of the output of said power amplifier means with the impedance of said transmitter closed-loop conducting means; the invention comprising portable receiver means to be carried by a person and including a portable pick-up coil adapted for movement relative to said transmitter closed-loop means and in inductive relation therewith, transistor amplifier means having an input coupled to said portable pick-up coil, acoustical driving means connected to said transistor amplifier means and adapted to be removably attached to an article of wearing apparel at a point spaced from the ears of the person carrying said portable receiver means, and directional acoustical means coupled to said driver means to direct toward the ears of the person the acoustical waves produced by said driver means in response to the audio frequency signals transmitted from said transmitter closed-loop conducting means to said portable pick-up coil.

2. In a communication system for a limited area and including an audio frequency signal source; power amplifier means for amplifying the output of said audio frequency signal source; transmitter closed-loop conducting means disposed around the periphery of the area within which communications are desired; means coupling said transmitter closed-loop conducting means to said power amplifier means for matching the impedance of the output of said power amplifier means with the impedance of said transmitter closed-loop conducting means; the invention comprising portable receiver means including a portable pick-up coil adapted for movement relative to said transmitter closed-loop conducting means and in inductive relation therewith, said portable pick-up coil including a bobbin, a plurality of turns of fine wire mounted thereon, and an internal solenoidal core consisting of a plurality of laminations having relatively diverging end portions.

3. In a communication system for a limited area and including an audio frequency signal source; power amplifier means for amplifying the output of said audio frequency signal source; transmitter closed-loop conducting means disposed around the periphery of the area within which communications are desired; means coupling said transmitter closed-loop conducting means to said power amplifier means for matching the impedance of the output of said power amplifier means with the impedance of said transmitter closed-loop conducting means; and portable receiver means including a portable pick-up coil adapted for movement relative to said transmitter closed-loop conducting means and in inductive relation therewith, and transistor amplifier means having an input coupled to said portable pick-up coil, the invention comprising acoustical driving means connected to said transistor amplifier means, and an acoustical horn coupled to said driver means to direct the acoustical waves produced by said driver means in response to the audio frequency signals transmitted from said transmitter closed-loop conducting means to said portable pick-up means, and detachable clip means to attach said acoustical driving means and said acoustical horn to an article of wearing apparel of and at a point spaced from the ears of a person carrying said portable receiver means.

4. A communication system for a limited area as described in claim 3, wherein said acoustical horn has an exponential configuration.

5. A communication system for a limited area such as described in claim 3, wherein said acoustical horn has a folded exponential configuration.

6. In a communication system for a limited area and including an audio frequency signal source; power amplifier means for amplifying the output of said audio frequency signal source; transmitter closed-loop conducting means disposed around the periphery of the area within which communications are desired; and impedance matching circuit means for coupling said transmitter closed-loop conducting means to said power amplifier means for matching the impedance of the output of said power amplifier means with the impedance of said transmitter closed-loop conducting means; the invention comprising portable receiver means including a portable pick-up coil, transistor amplifier means, and acoustical transducer means; said portable pick-up coil including a bobbin, a plurality of turns of fine wire mounted on said bobbin and an internal solenoidal iron core consisting of a plurality of laminations having relatively diverging end portions; said transistor amplifier means having an input coupled to said portable pick-up coil; said acoustical transducer means including driving means coupled to the output of said transistor amplifier means and a directional acoustical horn for directing the acoustical waves produced by said driver means in response to the audio frequency signals transmitted from said transmitter closed-loop conducting means to said portable pick-up coil, said driving means and said acoustical horn being adapted to being removably attached to an article of wearing apparel of a person carrying said portable receiving means.

References Cited in the file of this patent

UNITED STATES PATENTS

| | | |
|---|---|---|
| 2,252,641 | Poliakoff et al. | Aug. 12, 1941 |
| 2,530,621 | Lybarger | Nov. 21, 1950 |
| 2,567,431 | Halstead | Sept. 11, 1951 |
| 2,721,896 | Foot | Oct. 25, 1955 |

FOREIGN PATENTS

| | | |
|---|---|---|
| 495,171 | Great Britain | Nov. 8, 1938 |
| 1,071,308 | France | Aug. 30, 1954 |